(12) United States Patent
Bure

(10) Patent No.: US 6,811,419 B2
(45) Date of Patent: Nov. 2, 2004

(54) ELECTRICAL TRACTOR-TRAILER CONNECTOR WITH AN ELECTRICAL CONNECTION SENSOR

(75) Inventor: Rudolf Arthur Bure, Banbury (GB)

(73) Assignee: The Consultancy LTD, Banbury (GB)

( * ) Notice: Subject to any disclaimer, the term of this patent is extended or adjusted under 35 U.S.C. 154(b) by 0 days.

(21) Appl. No.: 10/343,496

(22) PCT Filed: Aug. 2, 2001

(86) PCT No.: PCT/GB01/03482

§ 371 (c)(1), (2), (4) Date: Aug. 28, 2003

(87) PCT Pub. No.: WO02/12004

PCT Pub. Date: Feb. 14, 2002

(65) Prior Publication Data

US 2004/0029456 A1 Feb. 12, 2004

(30) Foreign Application Priority Data

Aug. 5, 2000 (GB) .............................. 0019193

(51) Int. Cl.⁷ ............................................. H01F 29/00
(52) U.S. Cl. ........................................ 439/188; 439/35
(58) Field of Search ............................ 439/188, 35, 34, 439/36; 200/51.04, 51.1

(56) References Cited

U.S. PATENT DOCUMENTS

| | | | | |
|---|---|---|---|---|
| 3,822,920 A | * | 7/1974 | Bernhardt et al. | ............ 303/20 |
| 3,934,940 A | * | 1/1976 | Schnaibel | .................... 303/123 |
| 5,484,298 A | * | 1/1996 | Flum et al. | ................. 439/188 |
| 6,054,779 A | * | 4/2000 | Zubko | ........................ 307/10.8 |

* cited by examiner

*Primary Examiner*—Ross Gushi
(74) *Attorney, Agent, or Firm*—Pauk E Milliken; Ray L Weber

(57) ABSTRACT

A vehicle trailer male electrical connector 10, especially for use with a vehicle tracking or data logging system and which having an array of connector pins 11–17 for interconnecting electrical power between a vehicle trailer and tractor unit, and which includes an electrical switch 43 in an open or closed condition, and which is changed to the other of said open and closed conditions by engagement with a female connector on a tractor unit. The switch 43 is operated by one of said connector pins 11–17 which is axially displaceable on contact with the female connector.

12 Claims, 2 Drawing Sheets

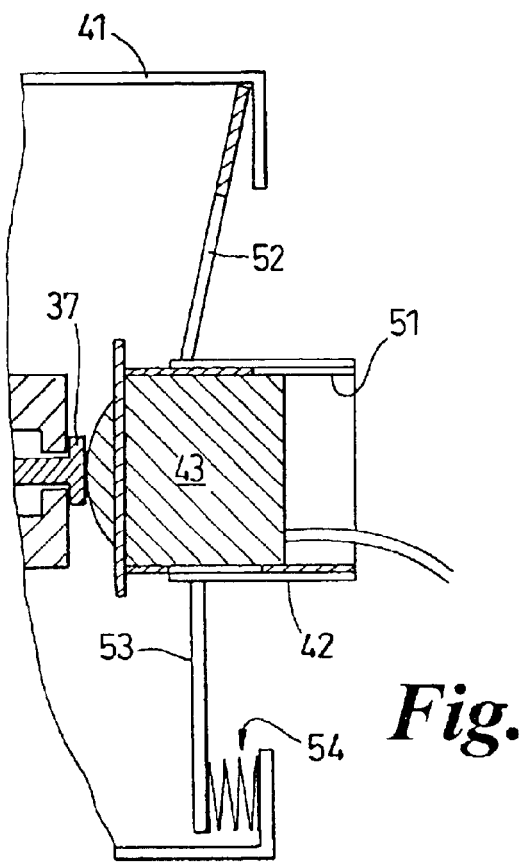
*Fig. 4*
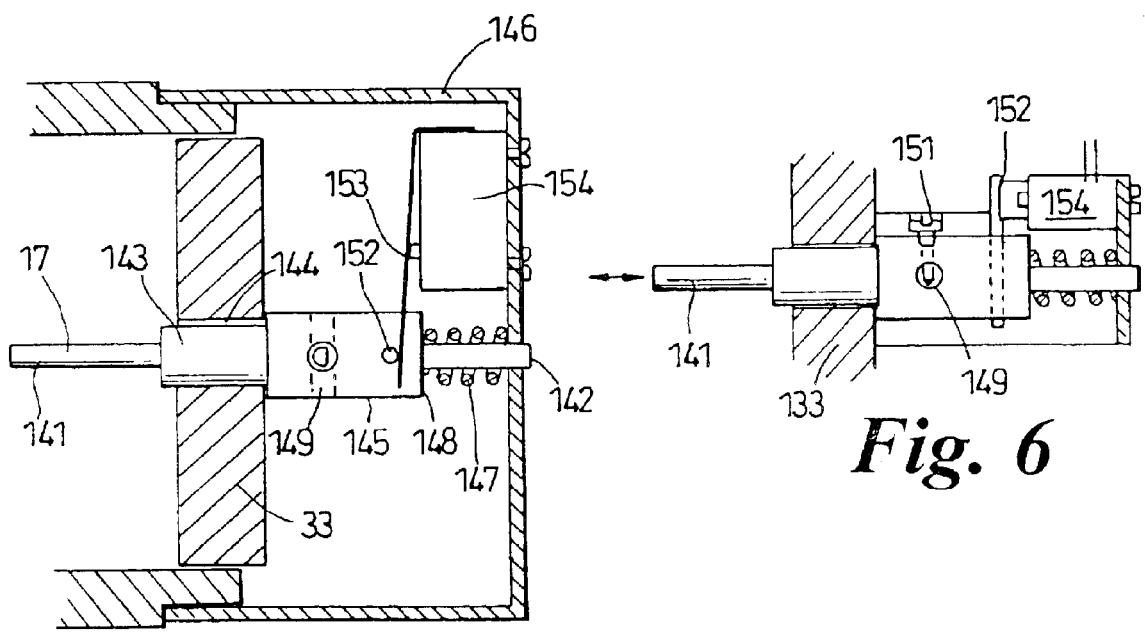
*Fig 5*
*Fig. 6*

ELECTRICAL TRACTOR-TRAILER CONNECTOR WITH AN ELECTRICAL CONNECTION SENSOR

FIELD

This invention relates to electrical connections of the type used to couple and uncouple the electrical system of a tractor unit to a trailer.

BACKGROUND OF THE INVENTION

The electrical connection between truck tractor units and trailers for such services as lights, brake lights, indicators is a standardised 7 pin ISO 1185 (24N) connector and other auxiliary equipment may be connected through a 7 pin ISO 3731 (24S) connector. Most trailers are equipped with both types of connector and additionally some trailers may be equipped with an ISO 7638 connector for the ABS system on trailer if fitted. As an alternative to the latter connector the ABS system can be activated through a stop light pins of the ISO 1185 connector. Recently a new ISO 12098 15 pin connector has been introduced to combine all the features of the other three connectors.

With the variety in Make, type and age of trailer the only standard connector which all trailers have is the ISO 1185 connector and even when some trailers have other additional connectors some drivers only make the minima electrical connections between the tractor unit and trailer to operate the lights and indicator, i.e using the ISO 1185 connector, and therefor the trailer has only intermittent electrical power only when the brakes, lights, or indicators are operated and connected through the ISO 1185 connector.

It is becoming desirable to install trailer tracking and/or data logging systems in vehicle trailers to report on the trailer locations and/or status e.g coupled or uncoupled to the motor vehicle. An intermittent power supply to a trailer makes it impossible to automatically detect whether the trailer is coupled or uncoupled to a tractor unit by sensing the power supply to the trailer.

OBJECTS OF THE INVENTION

The object of the present invention is to sense the coupled/uncoupled status of a vehicle trailer independently of the power supply to the trailer, and preferably by using the standard power connectors.

STATEMENTS OF THE INVENTION

According to the present invention there is provided a vehicle trailer male electrical connector having an array of electrical connector pins for interconnecting electrical power between a vehicle trailer and tractor unit and which includes a switch in one of an open or closed condition and which is operated through one of said pins to change the condition of the switch by axial displacement of said one pin on engagement with a co-operating female connector on the tractor unit.

Said one connector pin may be also used as a power connector, but is preferably not utilised as a power connector. The pins may be part of any ISO standard connector e.g. ISO 1185, ISO 3731, ISO 7638 or ISO 12098.

The pin at its inner end extends through the body of the connector to operate the switch when the pin is displaced.

The pin may include a coaxial extension which seats against, or is proximate to, the switch which may be a proximity switch, or is preferably a push button switch having an internal spring biasing the switch to a open condition.

Also according to the invention there is provided a method of activating a trailer tracking and/or data logging system sensing coupling and uncoupling between the tractor unit and a trailer in which method a switch, in an open or closed condition, is located on one half of a power connector which is used for electrically connecting the trailer to the tractor unit, and the condition of the switch is automatically changed when the two halves of the power connector are interconnected, the change in condition of the switch being sensed by said system.

DESCRIPTION OF THE DRAWINGS

The invention will be described by way of example and with reference to the accompanying drawings in which:

FIG. 4 shows a section through a trailer half of a an alternative connector, FIG. 5 shows a section through a trailer half of another connector, and FIG. 6 is a second view of the connector trailer half shown in FIG. 5.

DETAILED DESCRIPTION OF THE INVENTION

Figure 1:
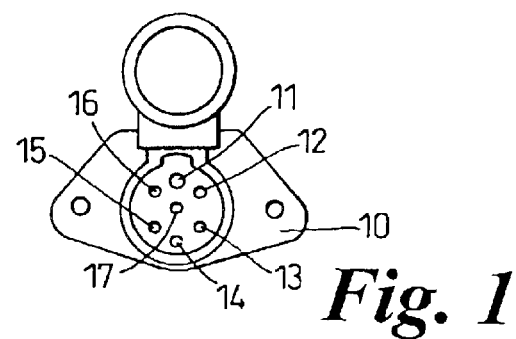
FIG. 1 shows a front elevation of the trailer half of a known tractor/trailer electrical connector showing the connector pin array.

With reference to FIG. 1 there is shown half of a 7 pin standard trailer lighting connector 10 (ISO 1185). ISO stands for International Standards Organisation which aims for world wide interchangeability as is agreed by committees of experts. The seven pins 11–17 have various functions, pin 11 is common power return, pins 12 and 16 for the tail lights, pins 13 and 15 are for the direction indicators, pin 14 is for the stop lights and pin 17 in the UK is typically a blank pin, but may be used in other countries for selected auxiliary functions.

Figure 2:
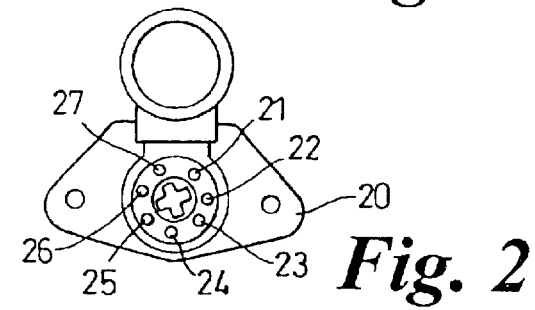
FIG. 2 shows the front elevation of the trailer half of a second type of known tractor/trailer electrical connector.

With reference to FIG. 2 there is shown a known ISO 7638 connector 20 having seven pins 21–27 arranged in a different pin array and which is used for connecting the trailer ABS system to the tractor ABS system. In this case the pins 25 and 26 are blank.

The blank pins 17, or 25, 26 in either of the above connectors, or a blank pin of the ISO 12098 connector, may be utilised for the present invention, although the invention will be described by way of example, with reference to FIG. 3 which is a section through an ISO 1185 connector which is presently fitted to all trailers.

Figure 3:
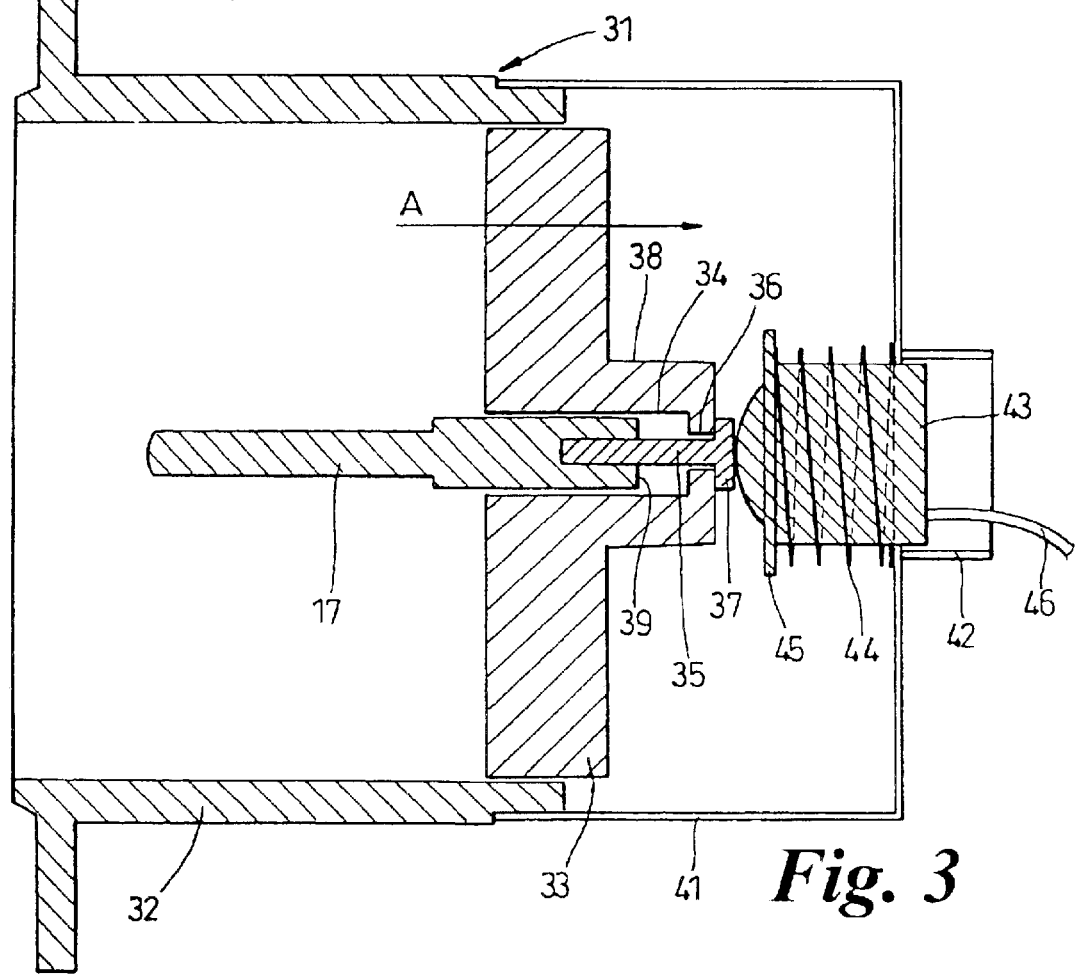
FIG. 3 shows a section through the trailer (male) half of a connector according to the present invention.

Now with reference to FIG. 3, the housing 31 of the male half of the connector 10 has a cylindrical body 32 with a pin socket 33 located at the inner end of the body 32 with the pins extending away from the socket 33. The pin 11 is the longest of the pins 11–16, and the blank pin 17 is located at the centre of the socket and is the longest of the pins 12–17. The inner end portion of the pin 17 locates in a cavity 34 in a raised boss 38 on the inner side of the sockets 33 and has a coaxial extension in the form of a smaller diameter shaft 35 which is fixed to its inner end face 39 by any suitable method e.g. screw fixing, adhesive etc.

The shaft 35 extends through a hole 36 in the base of the cavity 34 and has a larger diameter head 37 on its distal end. The pin 17 is capable of limited displacement within the cavity 34, the movement being limited by abutment of the end face 39 of the pin on one side of the cavity base, and abutment of the head 37 on the other side of the cavity base.

The inner end of the body 32 is covered by a cap 41, having a central hollow spigot 42 which houses an on/off switch 43, preferably a single pole push button switch 43, which is slidable within the spigot. The switch 43 is biased towards the head 37 by a spring 44, preferably an external coil spring, acting between the cap 41 and a shoulder 45 on the switch 43. The relative movement between the switch and cap under the bias of the spring 44 takes out any manufacturing tolerances and biases the switch 43 into contact with the head 37, which displaces the shaft and pin 17 outwardly until the head is in contact with the boss 38. The push button switch 43 may have an internal spring which biases the switch to one of an open or closed condition.

The spring characteristics of the internal spring and spring 44 are selected such that the spring force of the internal spring is just greater than the spring force of the spring 44. The components assembled together in such away that there is a constant pre-load on the spring 44 which pre-load is lower than the spring operating load of the switch 43 to keep the pin 17 pushed outwardly to its "at-rest" position without activating the switch.

The switch 43 is connected to a tracking or data logging system (not shown) by the electrical wire 46.

When the trailer is connected to a tractor unit the female half of the connector is pushed over the pins 11–17 in the direction of arrow A, moving the shaft head 37 inwards against the push button switch 43. There is an initial axial movement of the head 37 against the bias of spring 44 and the spring load in spring 44 increases changes until the load equals the switching load required for the operation of the switch 43. Once the switch is activated, the switch remains in an activated state and any further movement is against the bias of the spring 44, The change of condition of the switch which is sensed by the tracking/data logging system through the wire 46. The spring 44 ensures that the head 37 permanently retains the switch in an active state once both halfs of the connection has been properly interconnected.

In an alternative embodiment (see FIG. 5) the cap 41 may be replaced by a bracket fixed to the body 32, and the switch 43 may be a two pole on/off switch or a 3 pin change-over switch. A pin in any type of standard connector may be utilised for the present invention.

With reference to FIG. 4, there is shown an alternative arrangement in which the spigot 42 housing the switch 43 is mounted resiliently to the cap or bracket 41. The switch 43 may be adjustably mounted in the spigot 42 by a screw-threaded means 51. The spigot 42 can be connected to the cap 41 via resilient spring fingers 52 of a belleville type spring as is shown in the upper half of FIG. 4. Alternatively, as shown in the lower half of FIG. 4, the spigot 42 can be mounted in a rigid plate 53 attached to the cap 41 through spring or elastomeric mountings 54.

In this embodiment, since the position of the switch can be accurately adjusted relative to the head 37 so that "at rest" there is just no contact, the spring characteristics of belleville spring 52 or the resilient mountings 54 should be such that they exert a greater spring load that the internal spring of the switch 43.

With reference to FIGS. 5 & 6, there is shown a third embodiment in which the central pin 17 is a stepped diameter elongate pin having a smaller diameter inner and outer end portions 141, 142, a larger portion 143 adjacent the inner end which is a sliding fit in an aperture 144 in the body 33, with the largest diameter portion 145 adjacent the outer end. The outer end portion 142 is slidably supported in a bracket 146 and a concentric spring 147 acting between the bracket 146 and one face 148 of the largest diameter portion 145 biases the pin 17 inwardly until the other end face of the largest diameter portion abuts the body 33.

The pin 17 is prevented from rotation in the aperture 144 by co-operating flats on the pin and aperture edge. The largest diameter portion 145 has a diametral bore 149 therein for receipt of a circuit wire which may be held in place a terminal screw 151 normal thereto, The largest diameter portion also has a radial abutment 152 thereon, preferably a radial pin, which contacts an operating arm 153 of a microswitch 154. The microswitch 154 is mounted on the bracket 146 and its operating is formed from a leaf spring which is permanently in contact with the abutment.

The microswitch is operated when the pin 17 moves inwards against the spring 47 when the male half connector is coupled to a female half connector.

What is claimed is:

1. A vehicle trailer male electrical connector having an array of connector pins for interconnecting electrical power between a vehicle trailer and tractor unit and which includes a switch in one of an open or closed condition, and which is changed to the other of said open and closed conditions by engagement with a co-operating female connector on the tractor unit, wherein the switch is operated by one of said connector pins on the connector which is axially displaceable to operate the switch on contact with the female connector.

2. A connector as claimed in claim 1 wherein said one pin is also utilised as an electrical connector.

3. A connector as claimed in claim 1 wherein said one connector pin at its inner end extends through the body of the connector to operate the switch when the pin is displaced.

4. A connector as claimed in claim 3 wherein the pin includes a coaxial extension which is secured thereto for axial movement when the pin is displaced.

5. A connector as claimed in claim 4, wherein the pin extension is seated on a contact switch.

6. A connector as claimed in claim 3 wherein the distal end of the shaft is slidingly supported within a bracket mounted on the connector body and is resiliently biased towards the connector body, the shaft having a radial abutment thereon which operatively engages a switch.

7. A connector as claimed in claim 6, wherein the switch is micro switch operated through a leaf spring which engages said abutment.

8. A connector as claimed in claim 3 wherein the switch is a push button switch having an internal spring biasing the button to an open or off condition.

9. A connector as claimed in claim 8 wherein the switch is capable of limited movement relative to the connector body and is biased towards the pin by resilient means.

10. A connector as claimed in claim 9 wherein the internal spring has a lesser spring load that the resilient means.

11. A connector as claimed in claim 9 wherein the internal spring has a spring force which is just greater than the spring force of the resilient means, the resilient means being an external spring which is under a pre-tension load, and during movement of the pin the bias load in the external spring exceeds the operating load of the internal spring.

12. A method of activating a trailer tracking and/or data logging system sensing coupling and uncoupling between a tractor unit and a trailer in which method a switch, in an open or closed condition, is located on one half of a power connector which is used for electrically connecting the trailer to the tractor unit and, the power connector comprising a male half connector on the trailer having a plurality of connector pins and a female half connector on the tractor unit, the condition of the switch being changed by axial displacement of one of the connector pins on the male half connector when the two halves of the power connector are interconnected, the change in condition of the switch being sensed by said system.

* * * * *